United States Patent
Thornton et al.

(10) Patent No.: US 8,296,775 B2
(45) Date of Patent: Oct. 23, 2012

(54) EFFICIENT CONTEXT SWITCHING OF VIRTUAL PROCESSORS BY MANAGING PHYSICAL REGISTER STATES IN A VIRTUALIZED ENVIRONMENT

(75) Inventors: Andrew John Thornton, Seattle, WA (US); Shuvabrata Ganguly, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1365 days.

(21) Appl. No.: 11/701,320

(22) Filed: Jan. 31, 2007

(65) Prior Publication Data
US 2008/0183944 A1    Jul. 31, 2008

(51) Int. Cl.
G06F 9/46      (2006.01)
G06F 9/455    (2006.01)
G06F 7/38      (2006.01)

(52) U.S. Cl. .............................. 718/108; 718/1; 712/228
(58) Field of Classification Search .................. None
See application file for complete search history.

(56) References Cited

U.S. PATENT DOCUMENTS

| | | | |
|---|---|---|---|
| 6,223,208 B1 * | 4/2001 | Kiefer et al. .................. | 718/108 |
| 7,240,350 B1 * | 7/2007 | Eberhard et al. .............. | 719/314 |
| 7,426,728 B2 * | 9/2008 | Ruemmler et al. ........... | 718/100 |
| 2004/0123288 A1 * | 6/2004 | Bennett et al. ..................... | 718/1 |
| 2006/0224816 A1 * | 10/2006 | Yamada et al. .................... | 711/6 |
| 2007/0006228 A1 * | 1/2007 | Grobman et al. ................. | 718/1 |
| 2007/0074223 A1 * | 3/2007 | Lescouet et al. ............. | 718/108 |

* cited by examiner

*Primary Examiner* — Meng An
*Assistant Examiner* — Tammy Lee
(74) *Attorney, Agent, or Firm* — Woodcock Washburn LLP

(57) ABSTRACT

Various operations are disclosed for improving the operational efficiency of register handling in a virtualized environment. Some infrequently accessed software managed registers are managed lazily when switching contexts between virtual processors. The states of those registers are not saved on exit from a guest or restored on entry to the guest. Rather, guest accesses to those registers are intercepted. For some frequently accessed registers, register states are saved or restored only upon exit from a hypervisor to a different guest that that from which the hypervisor was entered. For enable-flag-gated registers, updates to a physical register value are not made unless the register is enabled. A shadow register cache may be used to speed accesses to some registers. When a shadowed register is modified, the new value is cached as a shadow copy in RAM and subsequent reads of the register are taken from the shadow copy.

20 Claims, 6 Drawing Sheets

EFFICIENT CONTEXT SWITCHING OF VIRTUAL PROCESSORS BY MANAGING PHYSICAL REGISTER STATES IN A VIRTUALIZED ENVIRONMENT

BACKGROUND

A virtual machine ("VM") is a software construct or the like operating on a computing device or the like (e.g., a host) for the purpose of providing an emulated machine or system. Typically, although not necessarily, the VM is an application or the like, and may be employed on the host to instantiate a use application or the like while at the same time isolating such use application from such host device or from other applications on such host. In one typical situation, the host can accommodate a plurality of deployed VMs, each VM performing some predetermined function by way of resources available from the host.

Notably, each VM as hosted on a computing device is for all intents and purposes a computing machine, although in virtual form, and thus represents itself as such both to the use application thereof and to the outside world. As an example, the VM and/or a use application thereof can and in fact do issue hardware requests for hardware resources of the VM, even though the VM might not in reality have such hardware resources. Instead, and as may be appreciated, such hardware requests are intercepted or otherwise redirected toward the host, and such host services such hardware requests based on the hardware resources thereof, typically with the requesting VM and/or use application thereof being none the wiser.

Typically, although not necessarily, a host deploys each VM thereof in a separate partition, address space, processing area, and/or the like. Such host may include a virtualization layer with a virtual machine monitor or the like that acts as an overseer application or hypervisor, where the virtualization layer oversees and/or otherwise manages supervisory aspects of each VM of the host, and acts as a possible link between each VM and the outside world. The hypervisor may be a separate application running in its own address space or may be integrated more closely with the host operating system, either directly or as an operating system extension of some sort, such as a device driver. Notably, the hypervisor of the host may intercept or otherwise redirect hardware requests that originate from each VM of the host and/or a use application thereof, and may at least assist in servicing the requests, again with the requesting VM and/or use application thereof being none the wiser.

Many computing systems comprise multiple processors. Processors in a uniprocessor or multiprocessor virtual machine environment may operate in a guest mode or in a hypervisor mode. When running in a guest mode, a processor uses virtual machine definitions to manage the virtual machine's guest operating system and applications, translating arguments and managing system resources without intervention from the hypervisor. From time to time, the guest operating system or applications may need system resources that must be managed by the hypervisor. As examples, the hypervisor may be required for error handling, system faults, intercepts for emulating devices, or interrupt handling. In these situations, the processor operates in a hypervisor mode.

In some systems, processors are virtualized. A virtual processor is a software construct or the like operating on a computing device or the like for the purpose of providing an emulated processor. Multiple virtual processors can be implemented on a single physical processor or on multiple physical processors. One technique used to partition a computer into a number of virtual machines is to multiplex more than one virtual processor on one or more physical processors.

In systems having multiple virtual processors, it is necessary to have a way to switch contexts from one virtual processor to another. Switching contexts between virtual processors is similar in some ways to switching threads that are multiplexed on a single physical processor in a traditional computing system. Hardware has developed over time to optimize the efficiency with which the context associated with a thread can be switched.

One way of implementing a context switch between two threads involves writing the state of the outgoing thread, including register values, to memory, reading in the (usually previously saved) state of the incoming thread, and resuming processing in the newly read state. There is a certain amount of overhead involved in all of the register accesses, memory reads, and memory writes associated with such a context switch.

One method of mitigating some of the overhead involved in switching contexts is the "lazy switch" in which some portions of the context are not written or read unless and until needed. One example of lazy switching has been used with respect to thread switching and floating point coprocessors. With lazy switching, the outgoing state of the floating point processor is not immediately saved upon switching threads. Only when a new thread accesses the floating point coprocessor is the old thread's state saved and the incoming thread's state loaded. By waiting for an actual floating point coprocessor access before changing contexts in the floating point coprocessor, some context switches are avoided completely. For example, suppose that a first thread is executing and has used the floating point coprocessor and so the first thread's context is loaded into the floating point coprocessor. If a second thread then executes but does not access the floating point coprocessor before a succeeding thread switch, the context of the second thread is never be loaded into the floating point coprocessor and the context of the first thread will remain loaded.

A virtual processor generally has a larger context than that associated with a thread. The context of a virtual processor generally involves several registers, some of which are not normally accessed frequently by an operating system. Some processor vendors have provided virtualization architectures having hardware assists to speed switching of some registers. Accesses to other registers have not been hardware optimized, and those registers are often slow to read and/or write.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Mechanisms for handling registers for efficiently switching context between virtual processors are described herein. Registers may be categorized in various ways related to their effect, the frequency of access, and the amount of assistance hardware provides in managing them. The registers may be handled in various ways depending on their categorization.

Some registers are eagerly switched. That is, guest operating system accesses to the registers are not intercepted but are rather allowed to proceed unmodified. The values of these registers, if they affect the operation of a hypervisor, are saved on entry to the hypervisor, replaced by the hypervisor's values, and restored upon return to the guest.

Other registers are lazily switched. That is, guest operating system accesses to these registers are intercepted. The values that do not affect the operation of the hypervisor are not saved and the virtual processor executing when the intercept occurred is marked as owning the physical register values. The intercept is then processed. Any modifications to these lazily managed registers are made to the appropriate virtual processor's copy and also to the physical register values if the update is in the context of the originally intercepted virtual processor. Only when exiting the hypervisor to a different virtual processor is the physical state saved and the new virtual processor's state loaded. This procedure optimizes for the most frequent behavior, which is to return to the originally intercepted virtual processor since the rate of intercepts is generally much higher than the rate at which virtual processors switch.

A shadow register cache may be used to speed access to certain register values. When some registers are modified, a copy of the value written to the register is cached as a shadow value in quickly accessible RAM. All succeeding reads from the register are then taken from the shadow.

DETAILED DESCRIPTION

Figure 1:
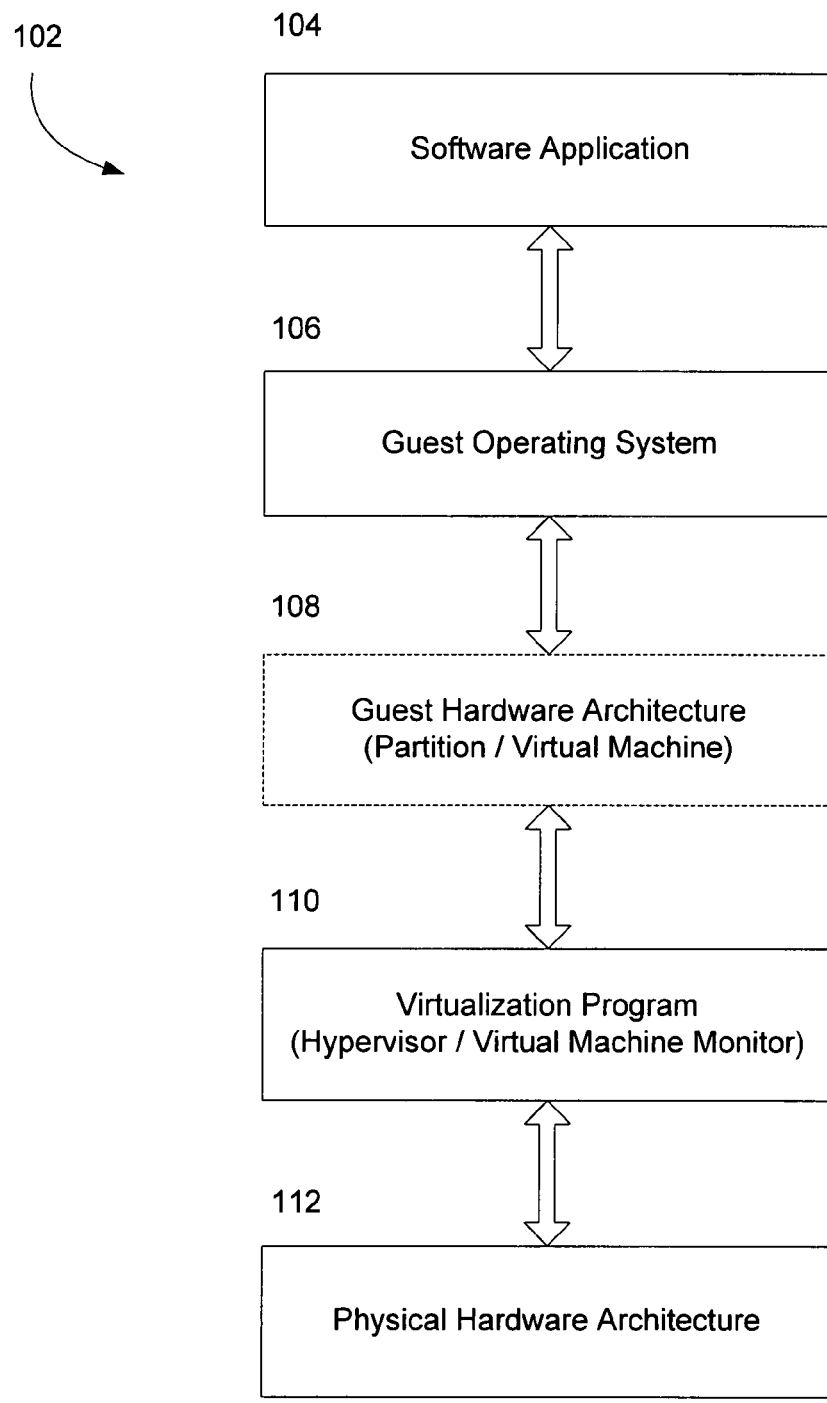
FIG. 1 is a block diagram representing the logical layering of the hardware and software architecture for a virtualized operating environment in a computer system.

Certain specific details are set forth in the following description and figures to provide a thorough understanding of various embodiments of the invention. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of embodiments of the invention, and the steps and sequences of steps should not be taken as required to practice this invention.

It should be understood that the various techniques described herein may be implemented in logic realized with hardware or software or, where appropriate, with a combination of both. Thus, the methods and apparatus, or certain aspects or portions thereof, may take the form of program code (e.g., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Overview

Various methods and systems are described for handling registers to improve the efficiency of context switching between virtual processors and to improve access speeds for certain registers by providing a shadow register cache. In general, a register is a structure capable of storing a state, used to speed execution of computer programs by providing quick access to commonly used values or to store values that may control certain states of the computing environment. Registers may be classified according to the type of data they hold and how it is used. Some examples include data registers, address registers, general purpose registers, floating point registers, instruction registers and index registers. Registers can also be categorized in a number of ways, described more fully below, related to, for example, their effect on the operation of the virtual processor, the frequency with which they will be accessed, and the amount of assistance hardware provides in managing them. The registers are handled in various ways depending on their categorization.

Virtualization in General

Diversity in operating systems and processor instruction sets can lead to reduced interoperability of software. Memory and I/O abstractions, both in high-level languages and in operating systems can remove some hardware resource dependencies, but some remain. Many operating systems are developed for a specific system architecture and are designed to manage hardware resources directly. This can limit the flexibility of a computer system in terms of available software and operating systems and can negatively impact security and failure isolation, especially when a system is shared by multiple users.

Virtualization provides a mechanism for increasing flexibility while enhancing security and reliability. Processors, memory, and I/O devices are examples of subsystems that can be virtualized. When a subsystem is virtualized, a virtual interface and virtual resources available through the virtual interface are mapped onto the interface and resources of a real system on which the virtualization is implemented. Virtualization can be applied not only to subsystems, but to an entire machine. A virtual machine's architecture is implemented in a layer of software on a real machine.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that said software layers are running on their own private computer system, and thus VMs can allow multiple "guest systems" to run concurrently on a single "host system."

FIG. 1 is a diagram representing the logical layering of the hardware and software architecture for a virtualized environment in a computer system. In FIG. 1, a virtualization program 110 runs directly or indirectly on the physical hardware architecture 112. The virtualization program 110 may be (a) a virtual machine monitor that runs alongside a host operating system or (b) a host operating system with a hypervisor component, where the hypervisor component performs the virtualization. The term virtual machine monitor is used as a general term for any of the various types of virtualization programs. The virtualization program 110 virtualizes a guest hardware architecture 108 (shown as dashed lines to illustrate the fact that this component is a partition or a "virtual machine"), that is, hardware that does not actually exist but is instead virtualized by the virtualizing program 110. A guest operating system 106 executes on the guest hardware architecture 108, and a software application 104 can run on the guest operating system 106. In the virtualized operating environment of FIG. 1, the software application 104 can run in a computer system 102 even if the software application 104 is designed to run on an operating system that is generally incompatible with a host operating system and the hardware architecture 112.

Figure 2:
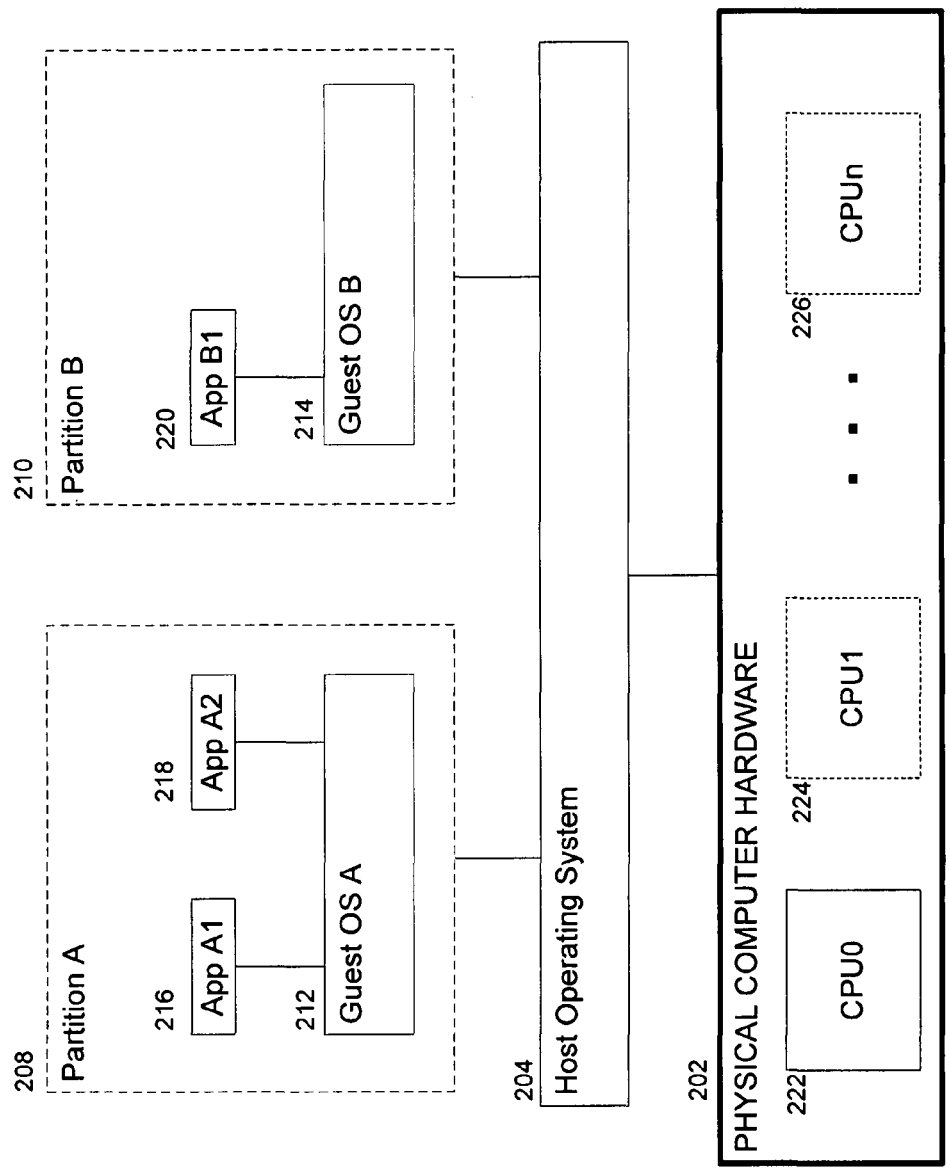
FIG. 2 is a block diagram representing a virtualized computing system, where virtualization is performed by the host operating system (either directly or via a hypervisor)

Next, FIG. 2 illustrates a virtualized computing system comprising a host operating system (host OS) software layer 204 running directly above physical computer hardware 202, where the host OS 204 provides access to the resources of the physical computer hardware 202 by exposing interfaces to partitions A 208 and B 210 for the use by operating systems A and B, 212 and 214, respectively. This enables the host OS 204 to go unnoticed by operating system layers 212 and 214 running above it. Again, to perform the virtualization, the host OS 204 may be a specially designed operating system with native virtualization capabilities or, alternately, it may be a standard operating system with an incorporated hypervisor component for performing the virtualization (not shown).

Referring again to FIG. 2, above the host OS 204 are two partitions, partition A 208, which may be, for example, a virtualized Intel 386 processor, and partition B 210, which may be, for example, a virtualized version of one of the Motorola 680X0 family of processors. Within each partition 208 and 210 are guest operating systems (guest OSs) A 212 and B 214, respectively. Running on top of guest OS A 212 are two applications, application A1 216 and application A2 218, and running on top of guest OS B 214 is application B1 220.

In regard to FIG. 2, it is important to note that partition A 208 and partition B 214 (which are shown in dashed lines) are virtualized computer hardware representations that exist only as software constructions. They are made possible due to the execution of specialized virtualization software(s) that not only presents partition A 208 and partition B 210 to Guest OS A 212 and Guest OS B 214, respectively, but which also performs all of the software steps necessary for Guest OS A 212 and Guest OS B 214 to indirectly interact with the real physical computer hardware 202. The physical computer hardware 202 may comprise a single central processing unit (CPU) 222, as in a uniprocessor environment, or multiple CPUs 222, 224, 226 as in a multiprocessor environment.

Figure 3:
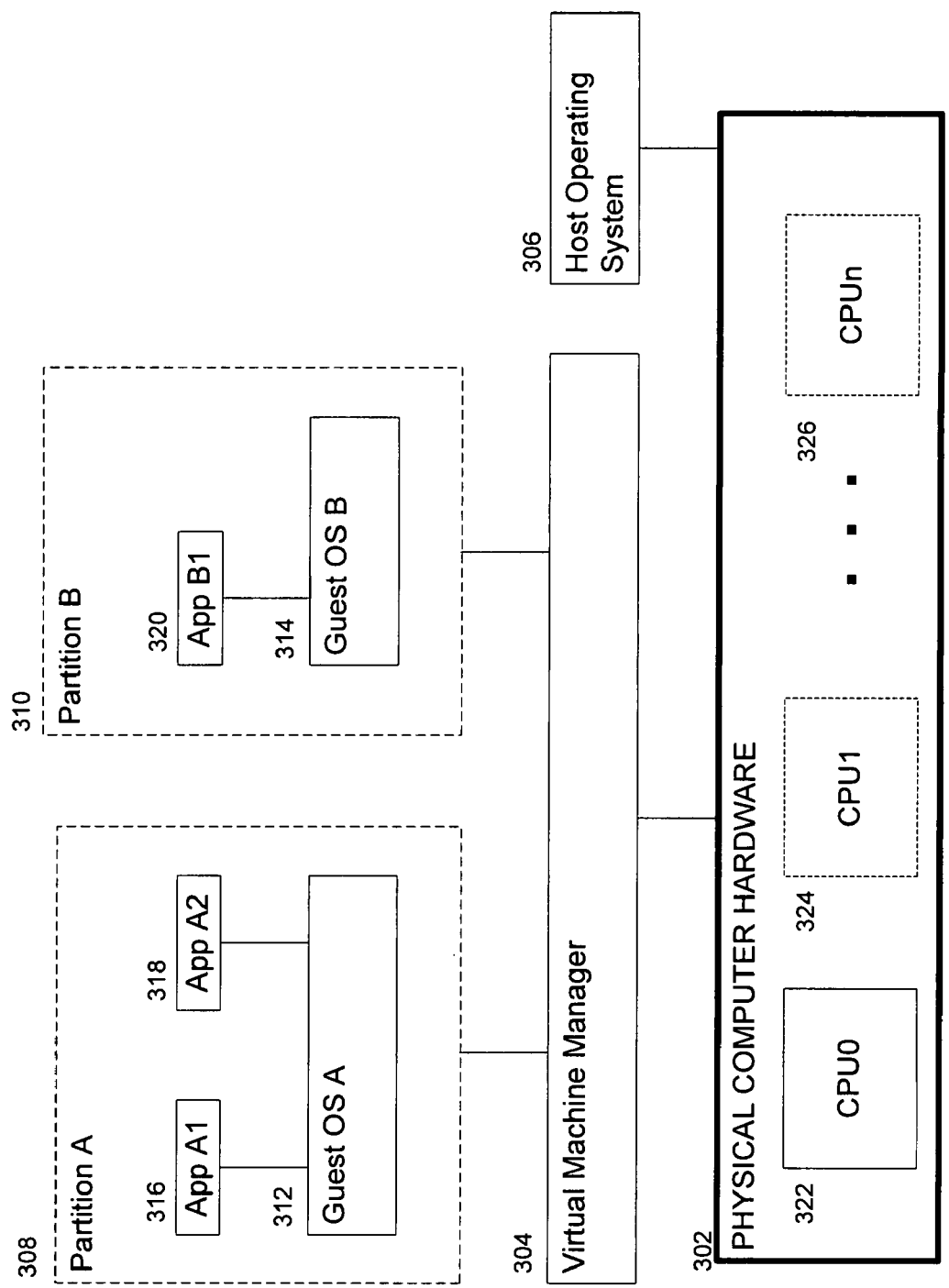
FIG. 3 is a block diagram representing an alternative virtualized computing system, where virtualization is performed by a virtual machine monitor running alongside a host operating system.

FIG. 3 illustrates an alternative virtualized computing system where the virtualization is performed by a hypervisor 304 running alongside the host operating system 306. In certain cases, the hypervisor 304 may be an application running above the host operating system 306 and interacting with the computer hardware 302 only through the host operating system 306. In other cases, such as shown in FIG. 3, the hypervisor 304 may instead comprise a partially independent software system that on some levels interacts indirectly with the computer hardware 302 via the host operating system 306, but on other levels the hypervisor 304 interacts directly with the computer hardware 302 (similar to the way the host operating system interacts directly with the computer hardware). And yet in other cases, the hypervisor 304 may comprise a fully independent software system that on all levels interacts directly with the computer hardware 302 (similar to the way the host operating system interacts directly with the computer hardware) without utilizing the host operating system 306 (although still interacting with the host operating system 306 in order to coordinate use of the computer hardware 302 and avoid conflicts and the like).

In the example illustrated in FIG. 3, two partitions, A 308 and B 310, lie conceptually above the hypervisor 304. Within each partition 308 and 310 are guest operating systems (guest OSs) A 312 and B 314, respectively. Running on top of guest OS A 312 are two applications, application A1 316 and application A2 318, and running on top of guest OS B 314 is application B1 320. The physical computer hardware 302 may comprise a single central processing unit (CPU) 322, as in a uniprocessor environment, or multiple CPUs 322, 324, 326 as in a multiprocessor environment.

Figure 4:
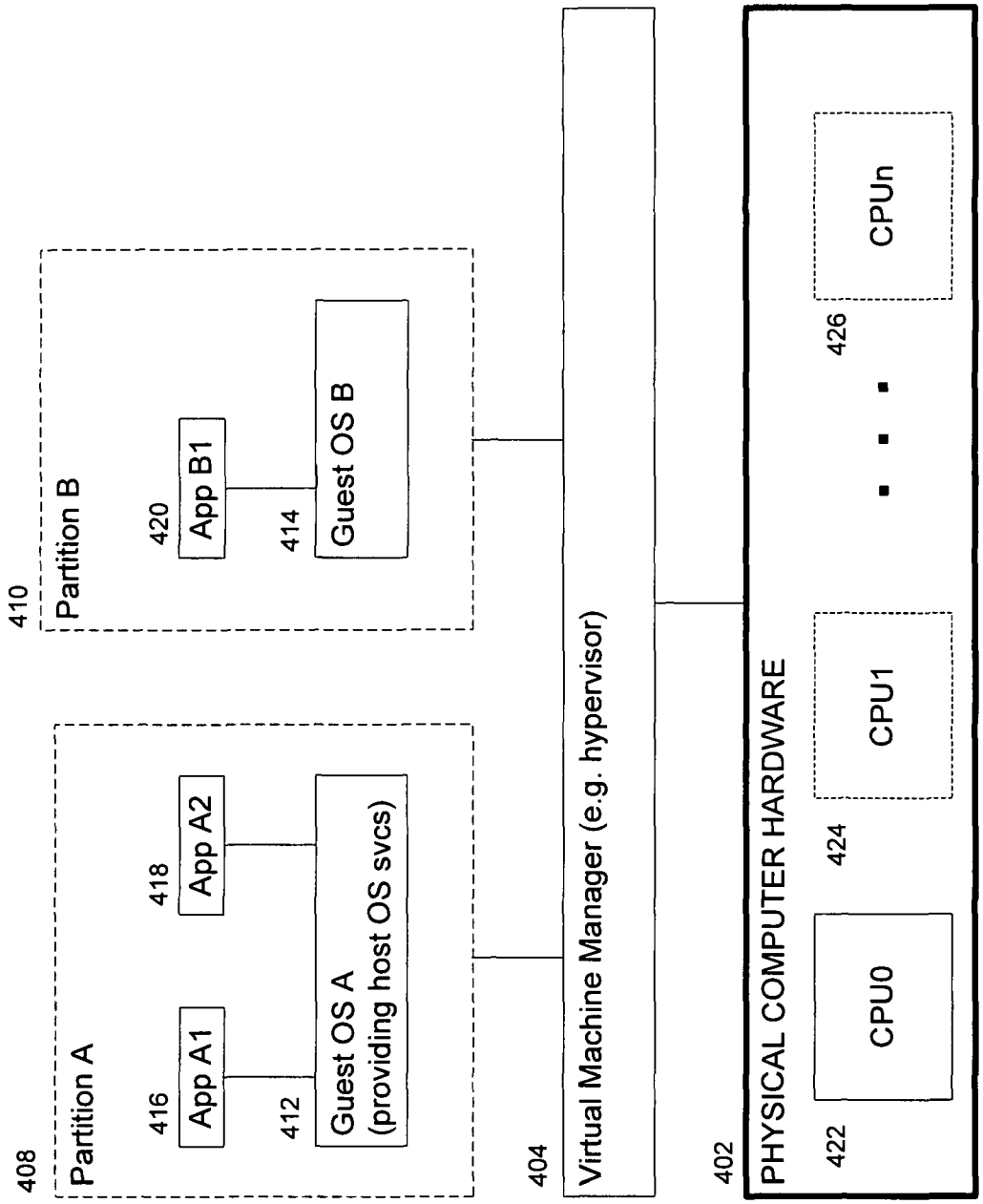
FIG. 4 is a block diagram representing another alternative virtualized computing system, where virtualization is performed by a virtualizer running independent of a host operating system.

FIG. 4 illustrates another alternative virtualized computing system where the virtualization is performed by a hypervisor 404. The hypervisor 404 comprises an independent software system that may interact directly with the computer hardware 402 without using a host operating system. The physical computer hardware 402 may comprise a single central processing unit (CPU) 422, as in a uniprocessor environment, or multiple CPUs 422, 424, 426 as in a multiprocessor environment.

In the example illustrated in FIG. 4, two partitions, A 408 and B 410, lie conceptually above the hypervisor 404. Within each partition 408 and 410 are guest operating systems (guest OSs) A 412 and B 414, respectively. Running on top of guest OS A 412 are two applications, application A1 416 and application A2 418, and running on top of guest OS B 414 is application B1 420. Guest OS A 412 provides host OS services. The physical computer hardware 402 may comprise a single central processing unit (CPU) 422, as in a uniprocessor environment, or multiple CPUs 422, 424, 426 as in a multiprocessor environment.

All of these variations for implementing the above mentioned partitions are just exemplary implementations and nothing herein should be interpreted as limiting the disclosure to any particular virtualization aspect.

Processor Virtualization

As mentioned above, processors are one of the subsystems of a computing machine that can be virtualized. Each partition in a virtualized environment may be associated with virtual processors. Processor virtualization enables a single physical processor to run multiple kernels that may involve multiple operating systems or multiple instances of the same operating system or a combination. There are two basic methods of processor virtualization, emulation and direct native execution, that can be used independently or combined. Emulation involves imitating, on virtualized resources, the exact actions that would have been performed by a given instruction on real resources. Emulation may be accomplished by, for example, interpreting each guest instruction in turn or by performing binary translation. Direct native execution involves the execution of guest instructions directly on the native hardware and is possible only under some circumstances where the instruction set architecture of the host is sufficiently similar to that of the guest.

A virtual processor may comprise data structures used for storing and restoring a virtual processor's state. In particular, a virtual processor's state will comprise a collection of register values. For example, one implementation of a hypervisor comprises suspend registers, interrupt registers, user-mode registers, registers, floating point registers, vector registers, control registers, debug registers, segment registers, table registers, virtualized model specific registers (MSRs), and various types of hypervisor-defined MSRs. Routines, which may be implemented in logic realized in software, hardware, or a combination of the two, handle storing and restoring virtual processor registers to facilitate context switching as described below.

In a basic multitasking or hyperthreading environment, a single operating system shares a processor among multiple threads, each having its own execution state. Processor sharing is implemented by enabling a processor to successively switch between threads. Task switching may be accomplished by saving the context, including the current state of relevant registers, of an outgoing thread and then swapping in a saved context of an incoming thread. The register values of the outgoing thread may be saved in a register file that can be stored in a dedicated cache.

Processor virtualization is generally a more complex undertaking than multitasking. The context of a virtual processor is generally larger than the context of a task or thread and generally involves many registers, including possibly some that are typically not frequently accessed by an operating system. Switching the context of a physical processor from one virtual processor to another may involve saving the state of the outgoing virtual processor and reloading the state of the incoming virtual processor into the physical processor. The information stored and retrieved in a context switch may include, by way of examples, the values of the instruction pointer, general registers, segment registers, control registers and other paging structures, floating point and vector registers, and others. Because a context switch can involve changing a substantial amount of data, and possibly verifying access permissions for the data, it can be a computationally very costly operation.

Register Attributes

Some modern processor architectures include hardware assists to speed the switching of some registers. For other registers, access has not been optimized and the registers can be slow to read and/or write. For example, some registers such as registers controlling the operation of the SYSCALL and SYSRET instructions are seldom accessed in a single operating system environment. Therefore, processors can be designed with relatively slow access to those registers. However, in a virtualized processor environment, those same registers may need to be swapped on every context switch, especially if the context switch involves a change between operating systems. For such registers, the overhead involved in context switching can be particularly great. In accordance with the disclosure herein, registers can be categorized in various ways related to their effect on the operation of the virtual processor, the frequency with which they are expected to be accessed, and the amount of assistance for managing them provided by hardware. The attributes of a particular register may depend, at least to some extent, on the particular physical processor architecture involved and on the particular operating system being run.

Some sets of registers, depending on the particular physical processor architecture, are updated automatically when switching between a virtual processors and a hypervisor. Some virtualization architectures provide a "switch context" instruction that saves the current values of these registers and loads new values from a specified location. Registers in such sets are called "hardware switched." For example, control registers Cr0 and Cr4 in the X64 architecture are hardware switched.

Registers that are not automatically hardware switched may need to be saved and loaded by software and are thus termed "software switched." For example, the X64 debug registers Dr0 through Dr3 are software switched.

It is sometimes necessary to present a different value to a guest operating system than the value actually programmed into a physical register: For example, there may be a need to hide a virtualization extensions enabled flag in a physical control register from a guest operating system. The value actually in the physical hardware register is referred to as the physical register value whereas the value presented to the guest operating system is called the virtual register value. Such registers are termed "virtualized registers."

Registers that are accessed frequently by an operating system are termed "hot registers." For example, the X64 page table pointer register Cr3 is hot. Registers that are accessed infrequently by the operating system during execution are termed "cold registers." For example, the X64 registers controlling the operation of the SYSCALL and SYSRET instructions are typically written only once, during system initialization, are generally cold.

Registers whose values immediately effect the operation of a virtual processor are termed "immediate effect" registers. For example, the X64 control registers Cr0 and Cr4 and the Extended Feature Enable Register ("EFER") are immediate effect registers in that they select the current operating mode of the processor.

For some registers, their effect may be conditioned on the state of a control flag, possibly located within a separate register. For example, the values in some SYSCALL registers are only meaningful if the Syscall Enable Bit in the EFER is set. Such registers are termed "enable-flag-gated effect" registers.

Processor virtualization extensions may allow some reads from and/or writes to some registers to be intercepted. For such "intercepted" registers, control is transferred to the hypervisor when a guest operating system accesses the register. The hypervisor may respond to the access by performing a variety of actions, including emulating the operation or relaying the access to the physical register.

Context Switching and Register Management

When a physical processor switches contexts between a guest mode and a hypervisor mode, it may be necessary to save at least some of the processor state for the outgoing mode and to restore or initialize at least some of the processor state for the incoming mode. The save and restore processes can be handled in various ways for various registers, depending, at least in part, on a given register's attributes and on what kind of context switch is occurring. Various schemes for handling registers are disclosed herein.

A register is said to be switched eagerly if the register's value associated with the outgoing context is saved and the register's value associated with the incoming context is restored when the processor context is switched. Generally, registers that are typically accessed by a guest at a rate that is significantly higher than the rate at which virtual processors are switched, such as hot registers, are good candidates for eager switching. It is possible to switch a register eagerly on exit from a guest to the hypervisor, on entry to a guest from the hypervisor, or both. Some registers may be switched eagerly on all exits from and entries to a guest. Other registers may be switched eagerly only on entry to a different guest from the one from which the hypervisor was entered. One embodiment of a system for determining which registers should be switched eagerly, and when, is disclosed below.

A register is said to be switched lazily if the register's value is not necessarily saved or restored on every exit from or entry to a guest context. Cold software switched registers are generally good candidates for lazy switching. One embodiment of a system for determining which registers should be switched lazily is disclosed below. Values for registers that do not affect hypervisor operation are not saved on entry to the hypervisor and the virtual processor executing when the intercept occurred is marked as owning the physical register values. When returning from the hypervisor to the same guest that was intercepted, no action is needed with respect to lazily switched registers. When exiting the hypervisor to a new guest, lazily switched registers are not saved or restored before the new guest begins operating. Instead, guest accesses of a lazily switched register are intercepted by the hypervisor. Register reads are emulated by the hypervisor and the appropriate guest's value for the register is returned. Register writes are also emulated by the hypervisor and the physical register value is updated along with the appropriate guest's value for the register. Lazy switching is well-suited to the situation when the hypervisor exits back to the previous virtual processor, the most frequently expected behavior since the rate of intercepts to the hypervisor is generally much higher than the rate at which two virtual processors swap.

A shadow register cache maintained in quickly accessible RAM may be used to speed access to some registers. All reads from such registers are taken from the shadow copy. Writes to the shadowed register are intercepted and the value in the shadow register cache is compared with the value to be written. If the values are identical, no action need be taken. If the values differ, the new value is written to both the physical register and to the shadow register cache. The shadow registers are associated with corresponding physical registers irrespective of the virtual processors. The shadow register cache is especially useful for cold registers with relatively slow access times where the computational costs of intercepting reads are more than paid back by the faster access times for the shadow registers.

Figure 5:
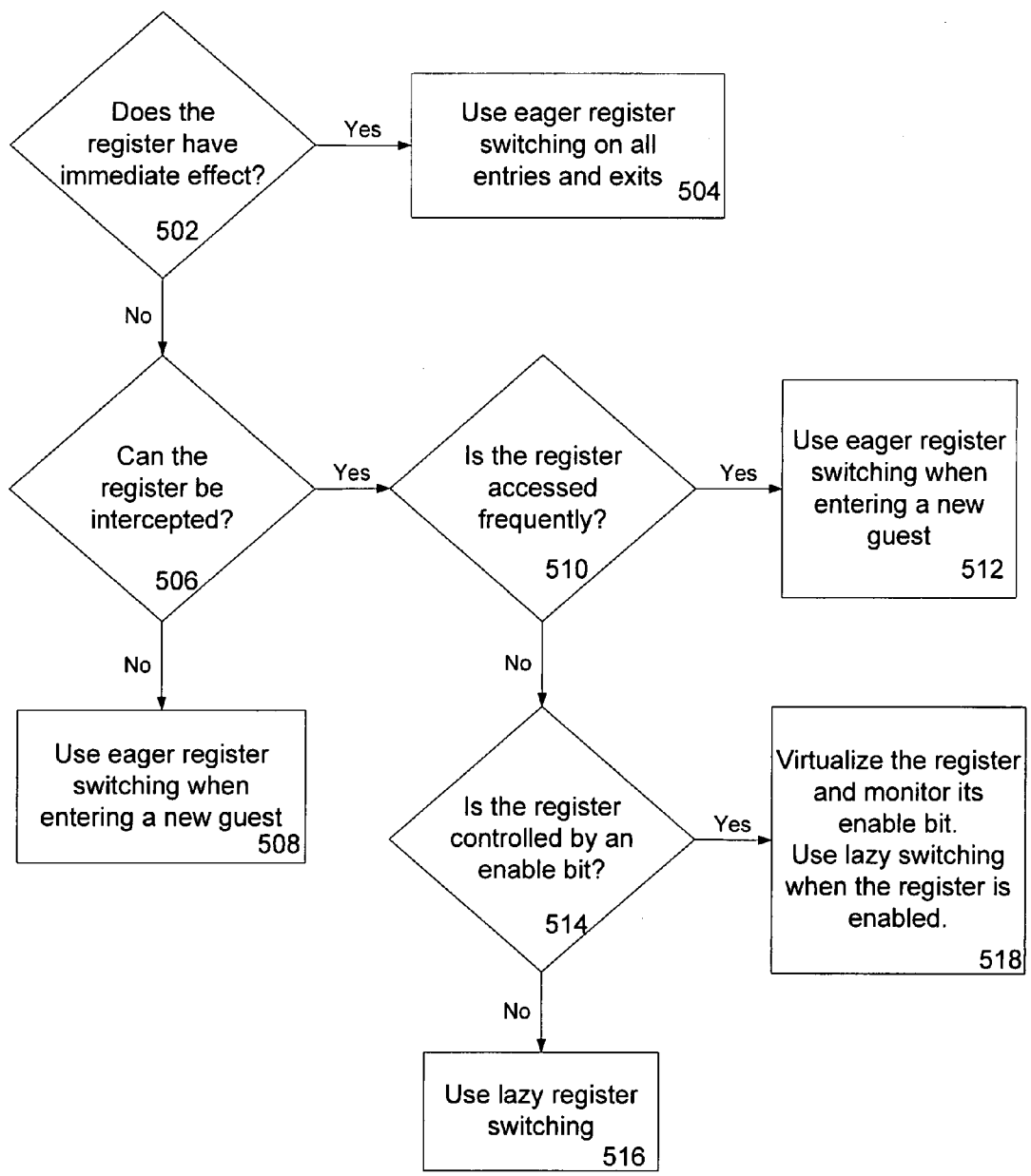
FIG. 5 is a flow chart illustrating a way of categorizing registers.

Registers may be categorized according to how they are to be handled in accordance with the disclosure herein. FIG. 5 depicts one embodiment of a system for classifying registers. A register has immediate effect 502 if its value immediately affects the operation of a virtual processor. Some examples of immediate effect registers are the X64 processor mode control registers Cr0 and Cr4. If a register has immediate effect 502, the register is switched eagerly, such as described above, on all entries into and exits from a guest 504.

For each register that does not have immediate effect, determine whether the register is capable of being intercepted 506. If the register is not susceptible to intercepting, the register is switched eagerly when entering a new guest 508, i.e., when returning from the hypervisor to a different virtual processor than the one from which the hypervisor was entered. For registers that do not have immediate effect 502 and can be intercepted 506, determine whether the register is accessed frequently 510, i.e., whether the register is hot. For those registers that are accessed frequently, switch the register eagerly entering a new guest 512. For those registers that are not accessed frequently, determine whether the register is controlled by an enable flag 514. If not, use lazy switching for the register 516. If so, the register should be virtualized and the enable flag, generally located in a different register, should be monitored 518. When the enable flag is set and the register is enabled, the register should be switched lazily. When the register is not enabled, the register has no effect and guest updates to the register need not be written to the physical register.

It is contemplated that register attributes other than those specifically identified herein may be considered when classifying registers. Also, the characterization of a register may vary over time and may depend, at least in part, on the current activity of the computing system. For example, a register that is cold in some situations may be hot in others. It may be advantageous to monitor register activity and to automatically reclassify some registers at runtime, based on the results of the monitoring.

Figure 6:
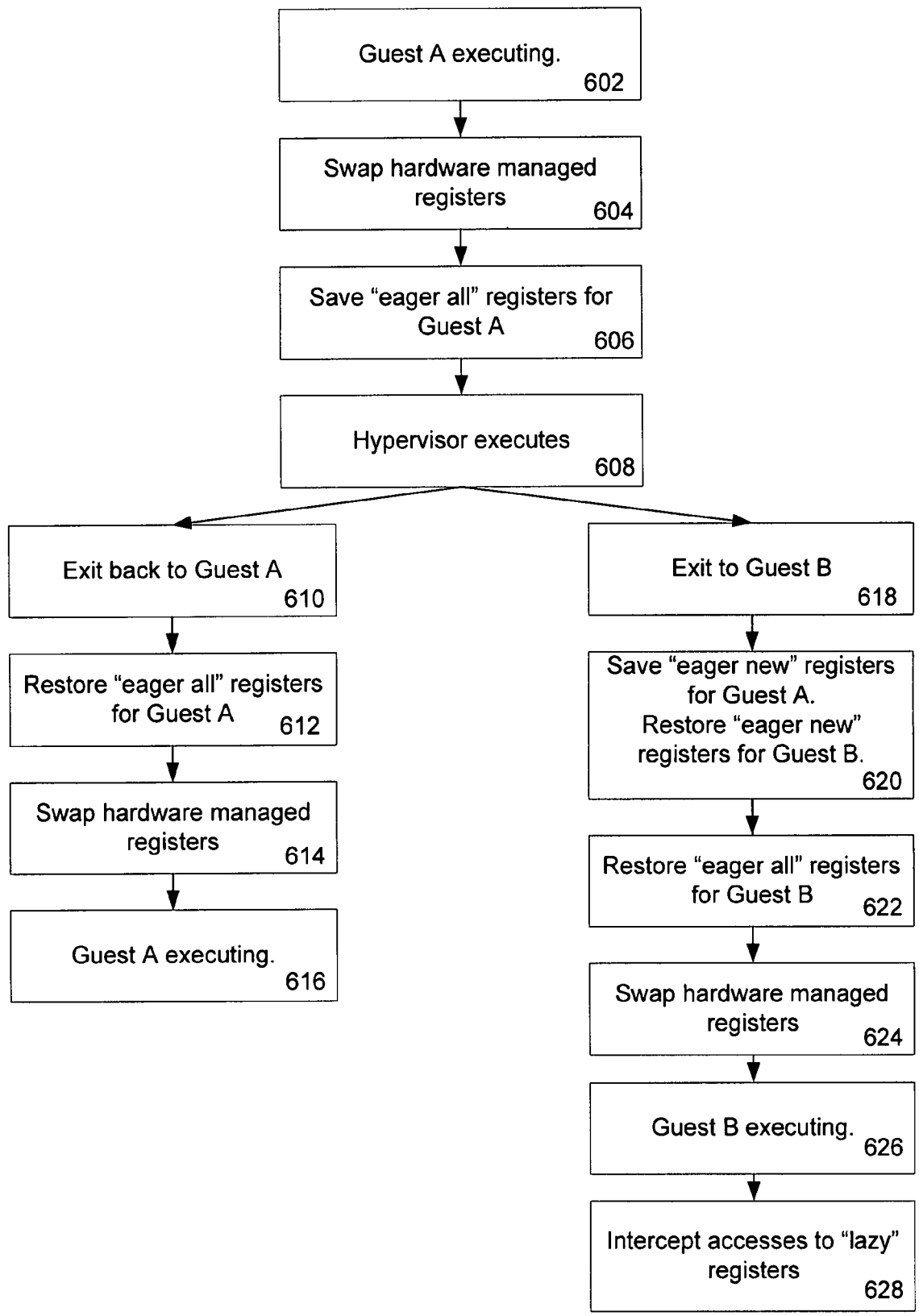
FIG. 6 is a flow chart illustrating a flow of execution for register handling during context switches

FIG. 6 depicts an embodiment of how register categorizations may be applied in practice. Suppose Guest A is executing 602 on a virtual processor. The process of exiting Guest A to enter the hypervisor comprises swapping the hardware managed registers 604 and saving the state of all registers for which eager switching on all entries and exits 504 (FIG. 5) is being used, denoted "eager all" registers for purposes of the chart. After the hypervisor executes 608, the hypervisor may exit back to the original Guest A 610 or to a different Guest B 618.

If the hypervisor exits back to the original Guest A 610, the values for the "eager all" registers that were saved 606 before entering the hypervisor are restored 612. Additionally, the hardware managed registers that were swapped 604 before entering the hypervisor are swapped back 614. Guest A then resumes executing 606.

The hypervisor may, instead, exit to a different Guest B 618, running on a different virtual processor. In this case, the state of those registers for which eager switching when entering a new guest 508, 512 (FIG. 5) is being used, denoted "eager new" registers for purposes of the chart, are stored and the state of those registers for Guest B are restored 620. In the case that Guest B is to run on a newly created virtual processor, the state of the "eager new" registers is initialized for Guest B rather than restored from a previously saved state. The state of any "eager all" registers for guest B is restored 622 (or initialized in the case of a newly created virtual processor). Hardware managed registers are swapped 624 and Guest B begins executing. Lazily switched registers 516, 518 (FIG. 5) are not saved or restored before Guest B begins executing.

Once Guest B is executing 626, accesses to lazily switched registers are intercepted 628. Register reads for these registers are emulated by the hypervisor and the Guest B's value is returned. Register updates are also emulated by the hypervisor and Guest B's version of the register is written with the new value and, if the register is not controlled by an enable-flag or if the register is controlled by an enable-flag that is set, the physical register is also written with the new value.

While the present disclosure has been described in connection with various embodiments, illustrated in the various figures, it is understood that similar aspects may be used or modifications and additions may be made to the described aspects of the disclosed embodiments for performing the same function of the present disclosure without deviating therefrom. For example, in various aspects of the disclosure, mechanisms were disclosed for improving the operational efficiency of interrupt processing in virtualized environments. However, other equivalent mechanisms to these described aspects are also contemplated by the teachings herein. Therefore, the present disclosure should not be limited to any single aspect, but rather construed in breadth and scope in accordance with the appended claims.

What is claimed:

1. A method of managing register states in a computing machine, the computing machine comprising at least one physical processor, a plurality of virtual processors, a hypervisor, and at least one physical register, the method comprising:
    associating a data structure with at least one of the virtual processors, said data structure configured to store data representative of a state of at least one physical register;
    determining whether the physical register has an immediate effect on an operation of a first virtual processor;
    if the physical register has an immediate effect on the operation of the first virtual processor, then switching an execution context of the physical processor from a first virtual processor to the hypervisor and saving data representative of the state of a physical register in a data structure associated with the first virtual processor;
    if the physical register does not have an immediate effect on the operation of the first virtual processor and is not capable of being intercepted, then switching the execution context of the physical processor from the first virtual processor to the hypervisor and saving data representative of the state of the physical register in the data structure associated with the first virtual processor;
    if the physical register does not have an immediate effect on the operation of the first virtual processor and is capable of being intercepted, then switching the execution context of the physical processor from the first virtual processor to the hypervisor and saving data representative of the state of the physical register in the data structure associated with the first virtual processor if the physical register is a hot register;
    if the physical register does not have an immediate effect on the operation of the first virtual processor and is capable of being intercepted, then switching the execution context of the physical processor from the first virtual processor to the hypervisor without saving data representative of the state of the physical register if the physical register is a cold register;
    switching the execution context of the physical processor from the hypervisor to a second virtual processor;
    if the physical register is the cold register, then intercepting, with the hypervisor, an attempt to access the physical register by the second virtual processor by transferring control to the hypervisor when the second virtual processor attempts to access the physical register; and
    emulating an action in response to the intercept.

2. A method as in claim 1 wherein the first virtual processor and the second virtual processor are the same.

3. A method as in claim 1 wherein:
    the attempt to access the physical register is a request to read the register state; and
    the emulated action comprises returning a state for the physical register wherein the returned state is associated with the register and with the second virtual processor.

4. A method as in claim 1 wherein:
    the attempt to access the physical register is a request to write an intended state to the register; and
    the emulated action comprises writing the intended state to the physical register and storing data representative of the intended state in a data structure associated with the second virtual processor.

5. A method as in claim 1 further comprising:
    determining whether a collection of registers affects operation of a virtual processor based on a status of a control flag, the collection of registers comprising at least one register;
    wherein the attempt to access the physical register is a request to write an intended state to the physical register wherein the physical register is in the collection of registers; and
    wherein the emulated action comprises storing data representative of the intended state in a data structure associated with the second virtual processor, determining the status of the control flag, and writing the intended state to the physical register in response to an indication by the status of the control flag that the collection of registers is effective.

6. A method as in claim 1 wherein the computing machine further comprises a shadow register cache, the method further comprising:
    storing the state of at least one physical register in a copy of the register in the shadow register cache;
    intercepting an attempt by a virtual processor to read the state of a first register of the at least one physical register whose state is stored in the shadow register cache;
    reading the state of the first register from the copy of the first register in the shadow register cache; and
    providing data representative of the state of the first register to the virtual processor.

7. A method as in claim 1 wherein the computing machine further comprises a shadow register cache, the method further comprising:
    storing the state of at least one physical register in a copy of the register in the shadow register cache;
    intercepting an attempt by a virtual processor to write an intended state to a first register of the at least one physical register whose state is stored in the shadow register cache;
    reading the current state of the first register from the copy of the first register in the shadow register cache;
    comparing the current state of the first register with the intended state;
    writing the intended state to the first register and to the copy of the first register in the shadow register cache in response to the current state of the first register differing from the intended state when the states were compared.

8. A method as in claim 1 further comprising:
monitoring attempted accesses to at least one physical register; and
modifying how a register of the at least one physical register is managed in response to results of the monitoring.

9. A system for managing register states in a computing machine comprising:
at least one physical processor;
a plurality of physical registers;
at least one virtual processor;
at least one data structure configured to store data representative of the state of at least one of the plurality of physical registers, each data structure being associated with one of the at least one virtual processor;
a hypervisor;
a categorization of the physical registers into at least two classes;
first logic for determining whether a physical register has an immediate effect on an operation of a first virtual processor;
second logic for switching an execution state of the physical processor from a first virtual processor to the hypervisor, the second logic configured to write data representative of the state of registers in a first class to a data structure associated with the first virtual processor while not writing data representative of the state of registers in a second class to the data structure, the first class of registers comprising registers that have an immediate effect on the operation of the first virtual processor, registers that do not have an immediate effect on the operation of the first virtual processor and that are not capable of being intercepted, and hot registers that do not have an immediate effect on the operation on the first virtual processor and that are capable of being intercepted, the second class of registers comprising cold registers that do not have an immediate effect on the operation on the first virtual processor and that are capable of being intercepted;
third logic for switching the execution state of the physical processor from the hypervisor to a second virtual processor, the third logic configured to load states into physical registers in the first class corresponding to data stored in a data structure associated with the second virtual processor; and
fourth logic to transfer control to the hypervisor in response to an attempt by the second virtual processor to write an intended state to a physical register in the second class.

10. A system as in claim 9 further comprising:
fifth logic to write the intended state to the physical register, and write data representative of the intended state to the data structure associated with the second virtual processor.

11. A system as in claim 9 further comprising:
at least one control flag for determining whether a collection of physical registers affects operation of a virtual processor wherein at least one register of the collection of physical registers is in the second class; and
fifth logic to intercept with the hypervisor an attempt by the second virtual processor to write an intended state to a physical register in the collection of physical registers, write data representative of the intended state to a data structure associated with the second virtual processor, and to write the intended state to the physical register in response to the status of the control flag indicating that the collection of physical registers is effective.

12. A system as in claim 9 further comprising:
a shadow register cache for storing data representative of the state of a collection of physical registers comprising at least one physical register; and
fifth logic configured to intercept an attempt by a virtual processor to read the state of a first physical register in the collection, read data representative of the state of the first physical register from the shadow register cache, and provide data representative of the state of the first physical register to the virtual processor.

13. A system as in claim 9 further comprising:
a monitor for monitoring attempted accesses to physical registers; and
fifth logic for modifying the categorization of the physical registers in response to the results of the monitoring.

14. A computer readable storage medium comprising computer executable instructions for managing register states in a computing machine, the computing machine comprising at least one physical processor, a plurality of virtual processors, a hypervisor, and at least one physical register, the instructions comprising instructions for:
associating a data structure with each of at least one of the virtual processors, said data structure configured to store data representative of state of at least one physical register;
determining whether the physical register has an immediate effect on an operation of a first virtual processor;
if the physical register has an immediate effect on the operation of the first virtual processor, then switching an execution context of the physical processor from a first virtual processor to the hypervisor and saving data representative of the state of a physical register in a data structure associated with the first virtual processor;
if the physical register does not have an immediate effect on the operation of the first virtual processor and is not capable of being intercepted, then switching the execution context of the physical processor from the first virtual processor to the hypervisor and saving data representative of the state of the physical register in the data structure associated with the first virtual processor;
if the physical register does not have an immediate effect on the operation of the first virtual processor and is capable of being intercepted, then switching the execution context of the physical processor from the first virtual processor to the hypervisor and saving data representative of the state of the physical register in the data structure associated with the first virtual processor if the physical register is a hot register;
if the physical register does not have an immediate effect on the operation of the first virtual processor and is capable of being intercepted, then switching the execution context of the physical processor from the first virtual processor to the hypervisor without saving data representative of the state of the physical register if the physical register is a cold register;
switching the execution context of the physical processor from the hypervisor to a second virtual processor;
if the physical register is the cold register, then intercepting, with the hypervisor, an attempt to access the physical register by the second virtual processor by transferring control to the hypervisor when the second virtual processor attempts to access the physical register; and
emulating an action in response to the intercept.

15. A computer readable storage medium as in claim 14 wherein the instructions for emulating an action in response to the intercept comprise instructions for:

reading data representative of the state of the physical register from a data structure associated with a virtual processor; and returning data representative of the read data to the second virtual processor.

16. A computer readable storage medium as in claim 14 wherein the instructions for emulating an action in response to the intercept comprise instructions for:

writing an intended state to the physical register; and storing data representative of the intended state in a data structure associated with the second virtual processor.

17. A computer readable storage medium as in claim 14 wherein the instructions further comprise instructions for:

determining whether a collection of registers affects operation of a virtual processor based on a status of a control flag, the collection of registers comprising at least one register;

intercepting an attempt to write an intended state to a first register in the collection of registers;

determining the status of the control flag in response to the intercept; and writing the intended state to the first register in response to an indication by the status of the control flag that the collection of registers is effective.

18. A computer readable storage medium as in claim 14 wherein the computing machine further comprises a shadow register cache, the computer readable medium further comprising instructions for:

storing the state of at least one physical register in a copy of the register in the shadow register cache;

intercepting an attempt by a virtual processor to read the state of a first register of the at least one physical register whose state is stored in the shadow register cache;

reading the state of the first register from the copy of the first register in the shadow register cache; and providing data representative of the state of the first register to the virtual processor.

19. A computer readable storage medium as in claim 14 wherein the computing machine further comprises a shadow register cache, the computer readable medium further comprising instructions for:

storing the state of at least one physical register in a copy of the register in the shadow register cache;

intercepting an attempt by a virtual processor to write an intended state to a first register of the at least one physical register whose state is stored in the shadow register cache;

reading the current state of the first register from the copy of the first register in the shadow register cache;

comparing the current state of the first register with the intended state; and writing the intended state to the first register and to the copy of the first register in the shadow register cache in response to the current state of the first register differing from the intended state when the states were compared.

20. A computer readable storage medium as in claim 14 further comprising instructions for:

monitoring attempted accesses to a physical register; and modifying how a register of the physical register is managed in response to results of the monitoring.

* * * * *